Jan. 31, 1928. 1,657,722

H. E. PAGE

CABLE GRIP AND METHOD OF MAKING SAME

Filed Nov. 8, 1926

INVENTOR.
H. E. Page
BY
Denison & Thompson
ATTORNEYS.

WITNESS
H. H. Hurst.

Patented Jan. 31, 1928.

1,657,722

UNITED STATES PATENT OFFICE.

HERBERT E. PAGE, OF SYRACUSE, NEW YORK.

CABLE GRIP AND METHOD OF MAKING SAME.

Application filed November 8, 1926. Serial No. 147,111.

This invention relates to a cable grip and to the method of making the same in which the intermediate portions of a plurality of strands of wire or other suitable material are bent into the form of a loop and incorporated in a tubular loop so that the ends of the strands extend beyond the ends of the loop and are interlaced or woven in the form of a flexible fabricated tube which is extensible and contractable axially and radially for the purpose of gripping, drawing and holding electric conduits and analagous objects during the process of installation or repairing.

These loops are adapted to be attached to more or less powerful hoisting or draft tackle and are, therefore, subjected to severe strains and wear and the main object of the present invention is to not only facilitate and expedite the assembling of the strands in the tubular loop but also to greatly increase the strength and wearing qualities of the cable grip as a whole and at the same time to reduce the wear upon the strands.

One of the specific objects is to thread the more or less straight strands through a straight metal tube of suitable length and then to bend the metal tube with the strands therein into the form of a loop with the ends of the tube in close contact with each other and with the peripheral strands so as to bind them firmly together at their points of exit from the ends of the tubular loop and subsequently to interlace the protruding ends of the strands about a common axis in the form of a tubular flexible gripping element capable of tightening upon the object when moved axially in one direction and of releasing the grip by movement in the reverse direction.

Another object is to bind the ends of the tubular loop together by means of a metallic ferrule held in place thereon by any suitable fastening means.

A further object is to protect the interlaced or interwoven parts of the strands near their junctions with the ends of the tubular loop by means of a tapered shield or sheathing of any suitable material which will reduce the liability of wear of these portions of the strands as the cable grip is manipulated in the operation of tightening or drawing an electric cable or other object endwise through a conduit or across other objects with which the cable grip may come in contact.

Other objects and uses relating to specific parts of the device will be brought out in the following description.

In the drawings:—

Figure 1:
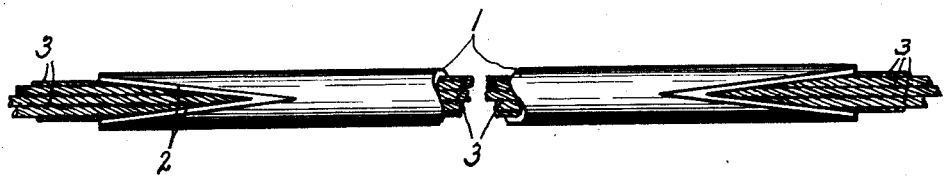
Figure 1 is a face view of portions of the elements of the cable grip, partly broken away, showing the manner of assembling the strands within a straight tube which is to form the loop.
Figure 2:
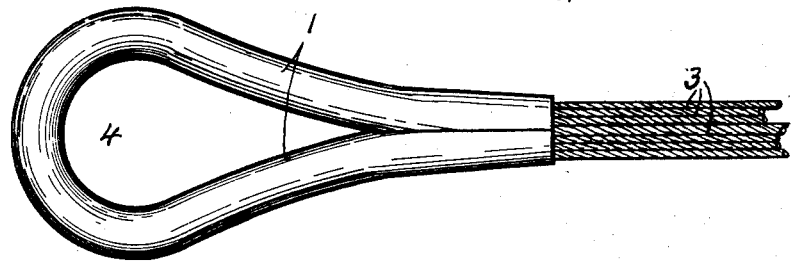
Figure 2 is a face view of a portion of the cable grip after the metal tube with the strands therein have been bent into the form of a loop.

In carrying out the objects stated a straight metal tube —1— of suitable diameter according to the work to be performed is cut to the required length to form a loop and the opposite ends of one side are chamfered or cut away at —2— equal distances from their ends to form abutting faces adapted to engage each other when the tube is bent into the form of a loop with its ends terminating in substantially the same transverse plane as shown in Figure 2.

A plurality of strands —3— of wire or other suitable material and preferably of uniform length considerably greater than the length of the tube —1— are threaded or passed through the metal tube —1— preferably while the latter is in a straightened position so that the ends of the strands may project substantially equal distances beyond the corresponding ends of said tube.

These strands —3— may be threaded or passed through the tube —1— in bunched relation or individually but in either case the number of strands employed will substantially fill the interior of the tube depending somewhat upon the size of the strands and interior diameter of the tube.

Figure 3:
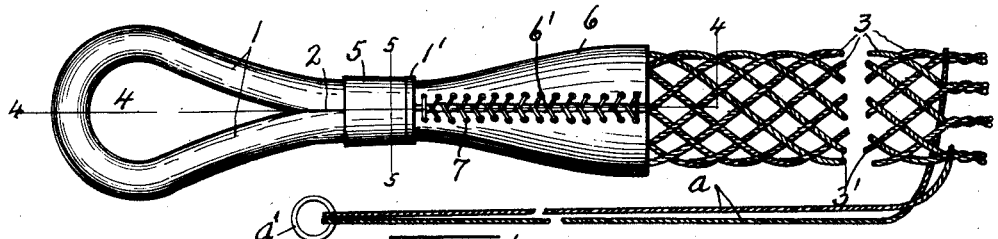
Figure 3 is a reduced face view of the completed cable grip showing the interwoven ends of the strands partly broken away.
Figure 4:
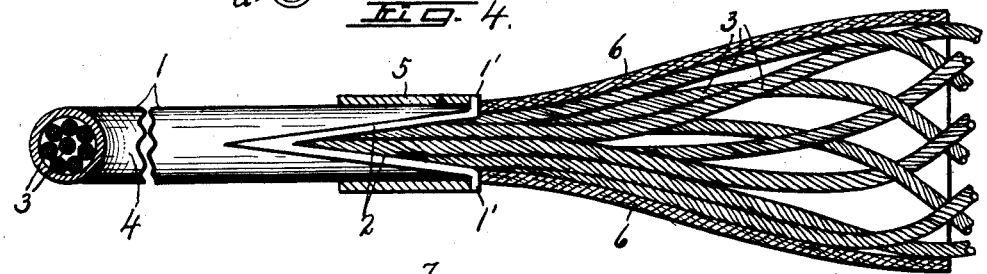
Figure 4 is an enlarged longitudinal sectional view taken on line 4—4, Figure 3.
Figure 5:
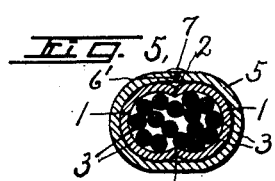
Figure 5 is an enlarged transverse sectional view taken on line 5—5, Figure 3.

When the strands and tubes are assembled in the manner described the central portions thereof are bent into the form of a loop —4— as shown in Figure 2 with the ends of the loop terminating in substantially the same transverse plane and their chamfered faces —2— contacting with each other while the ends of the strands extends axially some distance beyond the ends of the loop and are braided, woven or otherwise interlaced with each other about a common axis to form tubular gripping element —3'— as shown in Figure 3.

The end of the tubular loop —4— with the adjacent portions of the strands —3— extending therethrough are firmly bound together by means of a ferrule —5— or other suitable fastening means capable of holding the ends of the loop and ferrule against relative movement but in this particular instance after the ferrule is placed in operative position the end edges of the loop are swaged or upset against the adjacent edge of the ferrule to hold the latter against forward displacement while the flare of the loop from the ferrule —5— serves to hold said ferrule against endwise movement in that direction.

As the ends of the strands —3— protruding beyond the ends of the loop —4— are interwoven, braided or interlaced to form the flexible tube —3'— the diameter of the flexible tube is gradually enlarged from the adjacent end of the loop and offers more or less resistance to the free travel of the cable grip as a whole through conduits and across other objects and unless some provision for protecting these portions of the strands they are liable to become prematurely impaired by wear.

The means for reducing this impairment preferably consists of a tapered shield —6— encircling the portion of the fabric tube —3'— adjacent the ends of the loop —4— with its smaller end abutting against the outturned flange as —1'— at the inner end of the ferrule —5— to limit its endwise movement in that direction while the flare of the fabricated tube —3'— serves to hold the shield against movement in the other direction.

This shield —6— is preferably made of tough leather or equivalent material and in order to permit it to be placed in operative position is divided longitudinally through one side at —6'— and its edges drawn together by a suitable lacing —7— as shown in Figure 3.

It is evident, however, that similar shields of different materials may be used with equal facility.

A cable grip constructed in the manner shown and described may be easily and quickly made at a comparatively low cost by reason of the initial assembly of the straight strands through the straight tube while the bending of the combined tube and portions of the strands inclosed therein into the form of a loop greatly increases the strength of the cable grip where the strains are most severe and at the same time avoids excessive strains of individual strands by reason of their being bunched and bent into the loop thereby combining the full strength of the individual strands with the full tensile strength of the tube and reducing to a minimum the liability of breakage of any of the strands throughout their lengths.

The ferrule —5— or equivalent means for firmly holding the ends of the tubular loop and inclosed portions of the strands in firm relation against relative movement while the shield —6— protects the adjacent portion of the strands against excessive wear particularly when drawing the cable grip and object to which it is connected through a conduit or over more or less rough or uneven surface.

It is evident, however, that it might be practicable particularly with relatively small strands to first form the tubular loop —1— and then to thread the strands through the loop so as to project beyond the ends thereof without departing from the spirit of this invention.

It is also obvious that the chamfered portions —2— on the inner faces of the ends of the tubular loop might be omitted without departing from the spirit of the invention.

What I claim is:—

1. A cable grip having an eye portion at one end and a tubular open-work fabric portion at its opposite end, the inner end of the eye portion and adjacent end of the tubular fabric portion being contracted to a considerably less diameter of the tubular fabric, means for holding the contracted portion against expansion, and a shield covering the outer surfaces of the portion of the fabric from said holding means to the adjacent end of the larger diameter of the tubular fabric portion.

2. In a cable grip, an open-work tubular fabric composed of strands interlaced about a common axis, the strands at one end being convergently brought together around said axis some distance from the tubular fabric, means for binding said convergent strands together against expansion, and a shield covering the outer surfaces of the convergent strands and adjacent portions of the tubular fabric.

3. In a cable grip, a tubular draft eye having its ends parallel and in contact, a ferrule embracing said ends to hold them against separation and wire strands threaded continuously through the tube of the draft eye and their ends extending beyond the ends of the tube and interlaced with each other around a common axis to form an expansible and contractile tubular fabric.

In witness whereof I have hereunto set my hand this 3d day of November, 1926.

HERBERT E. PAGE.